US009469490B2

(12) United States Patent
Yohe et al.

(10) Patent No.: US 9,469,490 B2
(45) Date of Patent: Oct. 18, 2016

(54) APPARATUS AND METHOD OF PALLETIZING LOOSE-PIECE ARTICLES

(75) Inventors: Peter D. Yohe, Bloomsburg, PA (US); Ronald H. Cordingly, Berwick, PA (US); Kevin K. John, Bloomsburg, PA (US)

(73) Assignee: Dyco, Inc., Bloomsburg, PA (US)

(*) Notice: Subject to any disclaimer, the term of this patent is extended or adjusted under 35 U.S.C. 154(b) by 401 days.

(21) Appl. No.: 12/356,950

(22) Filed: Jan. 21, 2009

(65) Prior Publication Data

US 2010/0034633 A1 Feb. 11, 2010

Related U.S. Application Data

(60) Provisional application No. 61/086,510, filed on Aug. 6, 2008.

(51) Int. Cl.
*B65G 47/91* (2006.01)
*B65G 57/00* (2006.01)
*B65G 57/04* (2006.01)

(52) U.S. Cl.
CPC .......... *B65G 57/005* (2013.01); *B65G 47/912* (2013.01); *B65G 57/04* (2013.01)

(58) Field of Classification Search
CPC .......... B65G 2201/0244; B65G 47/66; B65G 57/04; B65G 57/24; B65G 57/245; B65G 61/00; B65H 2301/42324; B65H 2401/242; B65H 2406/34
USPC ....... 294/2, 64.1, 65; 414/627, 789.5, 791.6, 414/792.7–792.9, 793, 793.2, 795.9, 796.2, 414/796.9, 797, 978.9, 799, 922, 927, 929; 53/157
See application file for complete search history.

(56) References Cited

U.S. PATENT DOCUMENTS

| 2,598,222 | A | * | 5/1952 | Cahners et al. ........... 414/789.9 |
| 2,941,799 | A |   | 6/1960 | Reincke |
| 3,219,203 | A | * | 11/1965 | Jeremiah ..................... 414/790 |
| 3,300,065 | A | * | 1/1967 | Witmer ..................... 414/788.9 |
| 3,643,822 | A |   | 2/1972 | Birchall |
| 3,897,877 | A |   | 8/1975 | Vandermeer et al. |
| 3,917,082 | A | * | 11/1975 | Howard et al. ............. 414/796.4 |
| 3,994,407 | A |   | 11/1976 | Von Gal, Jr. et al. |
| 4,252,497 | A |   | 2/1981 | Burt |
| 4,759,673 | A | * | 7/1988 | Pearce et al. .............. 414/789.5 |
| 4,836,731 | A | * | 6/1989 | Abrahamson .............. 414/789.1 |
| 4,978,275 | A |   | 12/1990 | Reid et al. |
| 5,082,319 | A | * | 1/1992 | Hurliman et al. ......... 294/119.1 |
| 5,088,878 | A | * | 2/1992 | Focke et al. ................ 414/627 |
| 5,139,388 | A |   | 8/1992 | Martin |

(Continued)

FOREIGN PATENT DOCUMENTS

| JP | 59 190115 | 10/1984 |
| JP | 2003192133 A * | 7/2003 |
| JP | 2004 203621 | 7/2004 |

*Primary Examiner* — Gregory Adams
(74) *Attorney, Agent, or Firm* — McNees Wallace & Nurick LLC

(57) ABSTRACT

A method and apparatus for moving loose-piece articles positioned on a slipsheet. A vacuum head is moved into proximity with the loose-piece articles positioned on a slipsheet. A vacuum is created which causes the slipsheet, and the loose-piece articles positioned thereon, to be drawn toward a surface of the vacuum head and maintained in such position as the vacuum head transports the slipsheet and the loose-piece articles positioned thereon.

21 Claims, 18 Drawing Sheets

(56) References Cited

U.S. PATENT DOCUMENTS

| | | | |
|---|---|---|---|
| 5,271,709 A * | 12/1993 | VanderMeer et al. | 414/791.7 |
| 5,320,478 A * | 6/1994 | Gonsowski et al. | 414/792 |
| 5,339,957 A | 8/1994 | Carstens | |
| 5,375,493 A | 12/1994 | Focke et al. | |
| 5,375,967 A | 12/1994 | Rathert | |
| 5,501,553 A * | 3/1996 | Simkowski | 406/88 |
| 5,616,204 A | 4/1997 | Duffy et al. | |
| 5,676,364 A | 10/1997 | Shiiki et al. | |
| 5,844,807 A * | 12/1998 | Anderson et al. | 700/217 |
| 6,402,455 B1 * | 6/2002 | Vincent et al. | 414/789.5 |
| 6,641,131 B2 * | 11/2003 | Stohr et al. | 271/91 |
| 6,899,512 B2 | 5/2005 | Roth | |
| 7,387,460 B2 | 6/2008 | Coffelt et al. | |

* cited by examiner

APPARATUS AND METHOD OF PALLETIZING LOOSE-PIECE ARTICLES

RELATED APPLICATIONS

This application claims priority from Provisional Patent Application Ser. No. 61/086,510 filed on Aug. 6, 2008, which is hereby incorporated by reference.

FIELD OF THE INVENTION

The present invention is directed to a pickup head and method for palletizing loose-piece articles.

BACKGROUND OF THE INVENTION

When large numbers of stackable articles must be transported in large quantities to another location, especially when the article is small, the article may be packaged in a container to protect the article during shipping of the container. Alternately, to reduce the amount of handling required and/or to reduce the amount of shipping material consumed, the articles may be arranged in a tight grouping, or array of articles. Each array of articles can form a layer of articles that can be stacked on a pallet having a footprint which can be accommodated by freight hauling compartments, e.g., for truck, rail, sea or air vessels.

Palletizing articles is becoming increasingly automated in manufacturing facilities, wherein articles are moved via a conveyor, which articles are manipulated by dedicated machinery onto pallets.

Assembly of article arrays is currently performed using conventional bulk palletizers. Most conventional bulk palletizers build the complete article array or bulk array or article layer and then move or "sweep" the completed array layer or bulk array into position onto the finished pallet stack. Palletizing robots are also used, but most palletizing robots also move the completed article layer or bulk array onto the finished pallet stack. Alternately, the palletizing robots construct an article array by placing individual rows of articles to form the array onto the finished pallet stack.

The current state of the art of bulk palletizers includes several vacuum head constructions. One type of vacuum head creates the vacuum from a single opening proximate the center of the head. This type of vacuum head creates a large air flow which cooperates with the containers. The large air flow essentially draws the containers toward the vacuum head. This type of system is unreliable and can only be used with containers with sufficient surface area exposed to the vacuum. Because of these problems, the vacuum blower must be physically large and have a great deal of horse power to operate properly, making it expensive to purchase and to operate. Another type of vacuum head applies the vacuum directly to the containers. A form fitting foam or the like cooperates with each individual container. The vacuum head sucks the air from inside the containers to create a vacuum. This type of vacuum head can cause the walls of the containers to be damaged, i.e. thin walled containers can collapse. The unreliability of both of these systems is of concern. It would therefore be beneficial to develop and use a vacuum head which would distribute the vacuum uniformly to provide better reliability and require a much smaller vacuum blower, thereby reducing cost of operation and increasing reliability.

SUMMARY OF THE INVENTION

The disclosure is directed to a movable vacuum head for moving loose-piece articles positioned on a slipsheet. The movable vacuum head has a frame, a blower, a manifold and moveable walls. The blower is provided proximate to the frame and has an air intake member. The manifold has a top surface and a bottom surface. The top surface has an opening which receives the air intake member therein. The bottom surface has a plurality of openings which extend through the bottom surface and which are spaced periodically over the entire surface area of the bottom surface. The movable walls extend from the frame and are positioned proximate the bottom surface of the manifold. As the vacuum head is moved into proximity with the loose-piece articles and the slipsheet, and the blower is activated, a vacuum is created which causes the slipsheet, and the loose-piece articles positioned thereon, to be drawn toward the bottom surface of the manifold and maintained in such position as the movable vacuum head transports the slipsheet and the loose-piece articles positioned thereon.

The description is also directed to a loose-piece array forming table for forming an array of loose-piece articles on a slipsheet. An array building area is provided on the array forming table. A slipsheet receiving area is proximate the array building area. The array building area and the slipsheet receiving area have a planar work surface which extends therebetween. A slipsheet hold down mechanism is provided between the array building area and the slipsheet receiving area. The slipsheet hold down mechanism is moveable between an open position which allows the slipsheet to be positioned on the slipsheet receiving area and a closed position in which an edge of the slipsheet is engaged by the slipsheet hold down mechanism. A movable wall cooperates with the loose-piece articles to advance the loose-piece articles from the array building area to the slipsheet receiving area.

The description is also directed to a method of transporting loose-piece articles using a vacuum head. The method includes the steps of: placing the loose-piece articles on a slipsheet in a first collection area; moving the vacuum head proximate the loose piece articles and the slipsheet; drawing air through a surface of the vacuum head, the surface having a plurality of openings which extend through the surface and which are spaced periodically over the entire surface area of the surface, thereby creating a vacuum below the surface; and using the vacuum to draw the slipsheet toward the surface, thereby drawing the loose-piece articles on the slipsheet toward the surface. Transporting the slipsheet and loose-piece articles to a second collection area.

The present invention, by making use of a slipsheet disposed beneath the loose-piece article or container array, in which the vacuum pickup head picks up the combination container array and slipsheet, requires a much smaller motor, is lightweight, is less expensive to purchase and operate, is much more efficient, and is significantly more quiet. In addition, due to the use of the slipsheet and smaller motor on the vacuum head, the containers are less likely to be damaged during transportation. The method and system also maintains control of the containers, preventing the containers from moving out of position or from tipping.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
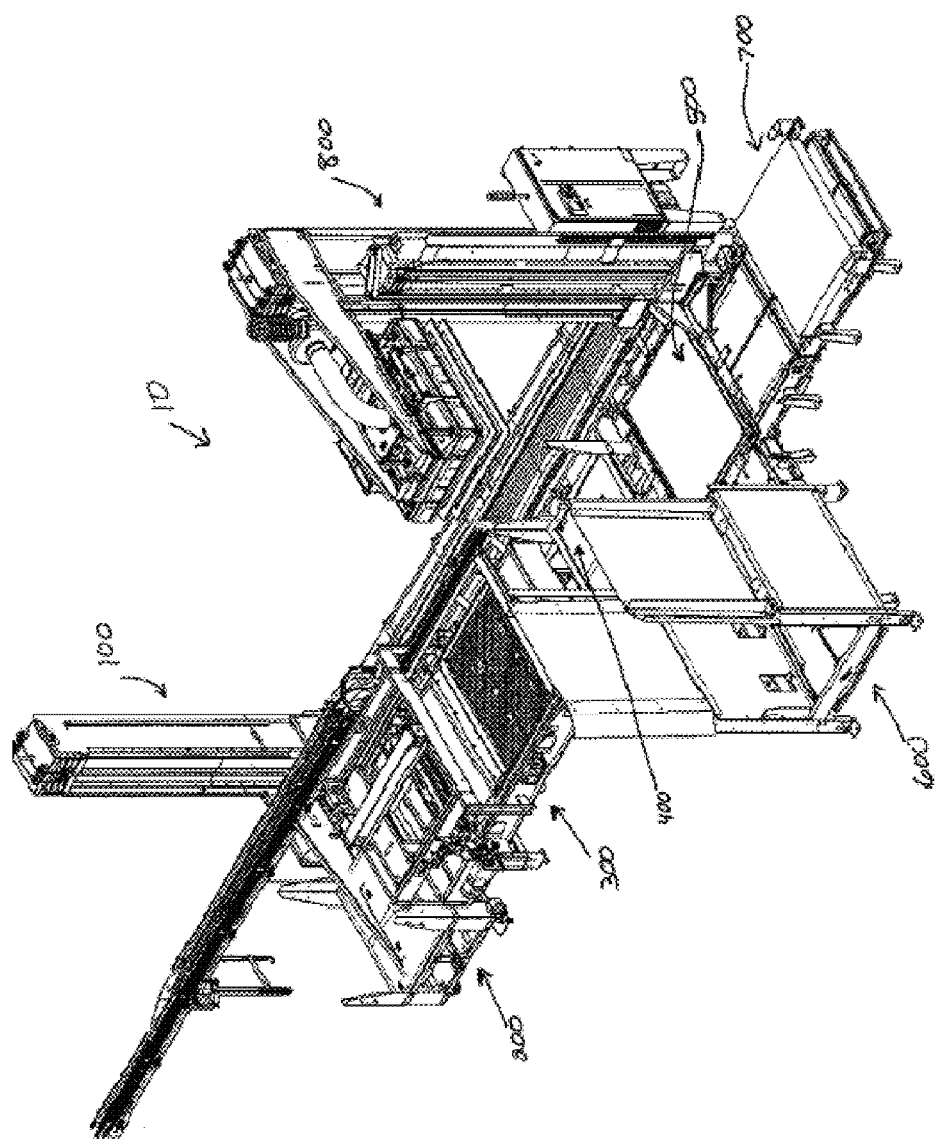
FIG. 1 is a perspective of the automated system showing the different stations.
Figure 2:
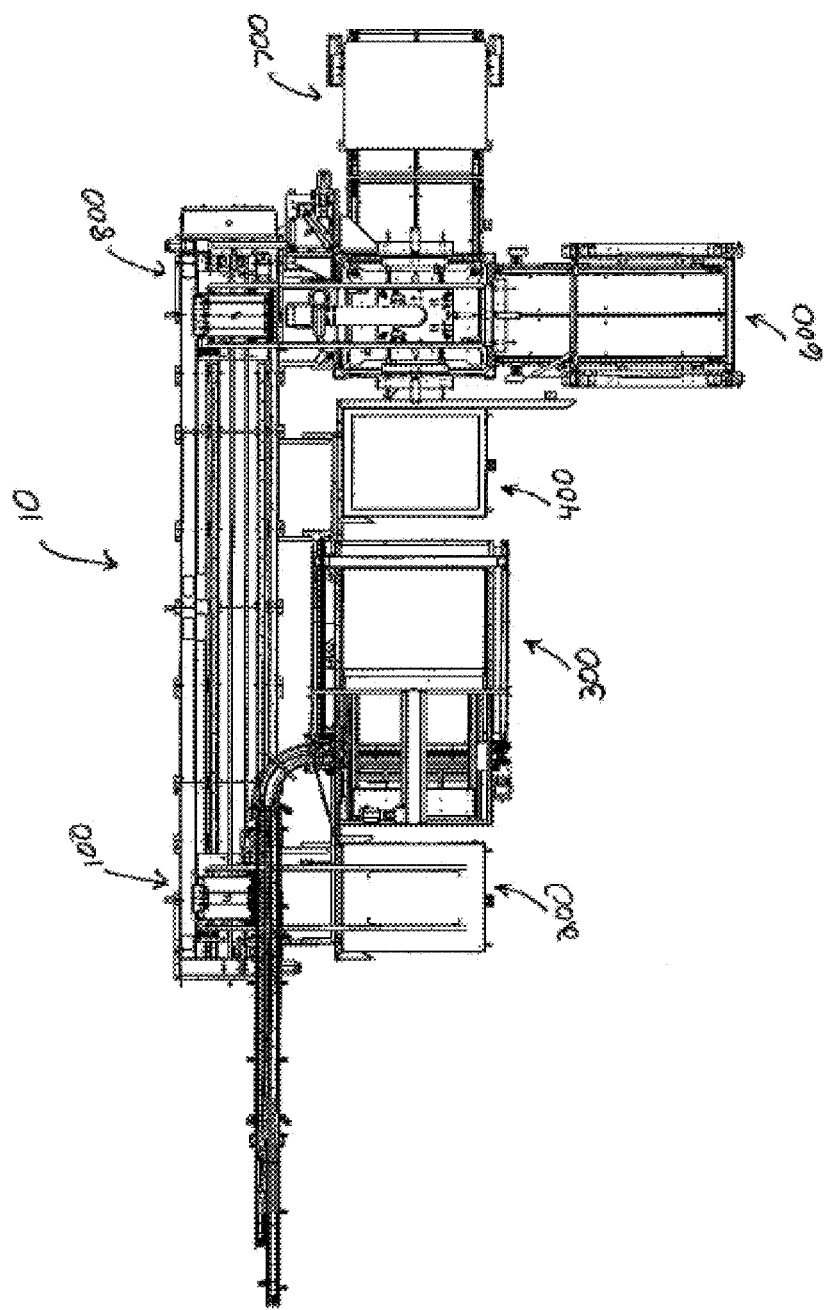
FIG. 2 is a top view of the automated system of FIG. 1.

Referring to FIGS. 1 and 2, an automated system 10 for palletizing loose-piece articles, such as plastic containers or bottles, is shown. The automated system 10 has a slipsheet lifting/transfer tower 100, a slipsheet bin 200, a loose-piece or container array forming table 300, a top-frame bin 400, a pallet-building area 500, a pallet infeed assembly 600, a pallet discharge conveyor 700 and an array lifting/transfer tower 800. Although a separate slipsheet lifting/transfer tower 100 and a separate array lifting/transfer tower 800 are shown, these towers can be combined into one unit. The automated machine system 10 is controlled using a computer or other similar control device to coordinate the movements of the slipsheet lifting/transfer tower 100, the array lifting/transfer tower 800 and other components. Other configurations and layouts of the automated system 10 can be used without departing from the scope of the invention.

Figure 4:
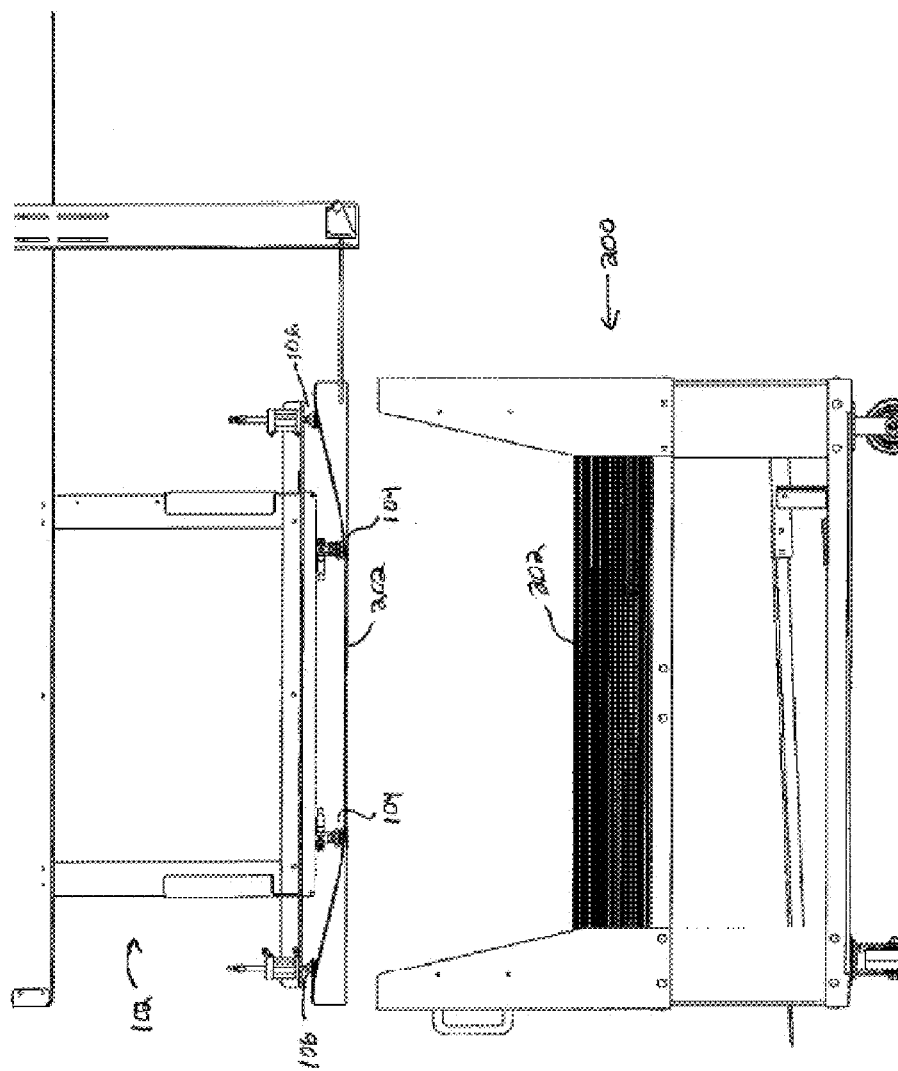
FIG. 4 is a side view of the lift head positioned over a slipsheet bin, the lift head having a slipsheet provided thereon.

Referring to FIG. 4, slipsheets 202 are positioned in the slipsheet bin 200. The slipsheet bin 200 is provided on wheels to be movable to allow the slipsheet bin 200 to be moved from its position relative to the slipsheet lifting/transfer tower 100 when the slipsheet bin 200 is empty. A new slipsheet bin 200 with additional slipsheets 202 can then be moved into position.

Figure 3:
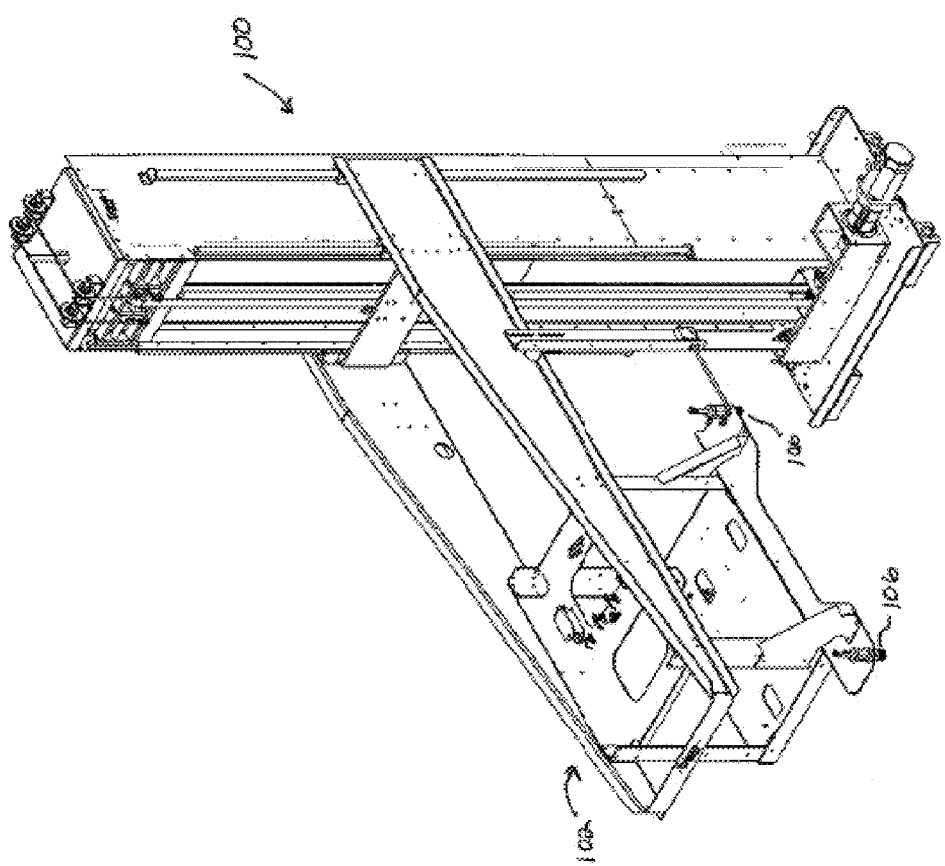
FIG. 3 is a perspective view of a slipsheet lifting/transfer tower including a lift head of slipsheet lifting/transfer tower.

Referring to FIGS. 3 and 4, the slipsheet lifting/transfer tower 100 has a lift head 102 which has fixed suction members 104 (FIG. 4) and movable suction members 106. The movable suction members 106 have a pneumatic actuator, motor or other mechanism known in the industry which is electronically connected to the control device to allow the movable suction members 106 to be extended and retracted. The lift head 102 is moved down onto a slipsheet 202. As the lift head 102 is moved, the suction members 104, 106 engage the slipsheet 202. This causes a suction seal to be created between the slipsheet 202 and the suction members 104, 106. With the suction seal created, the movable suction members 106 are retracted upward, thereby causing the corners to be upward, as shown in FIG. 4. The lift head 102 is further raised and the slipsheet lifting/transfer tower 100 is moved such that the slipsheet 202 is positioned above the container array forming table 300. The movement of the slipsheet lifting/transfer tower 100 is controlled by a computer or similar control device and is driven by any appropriate drive mechanism known in the art.

Figure 5:
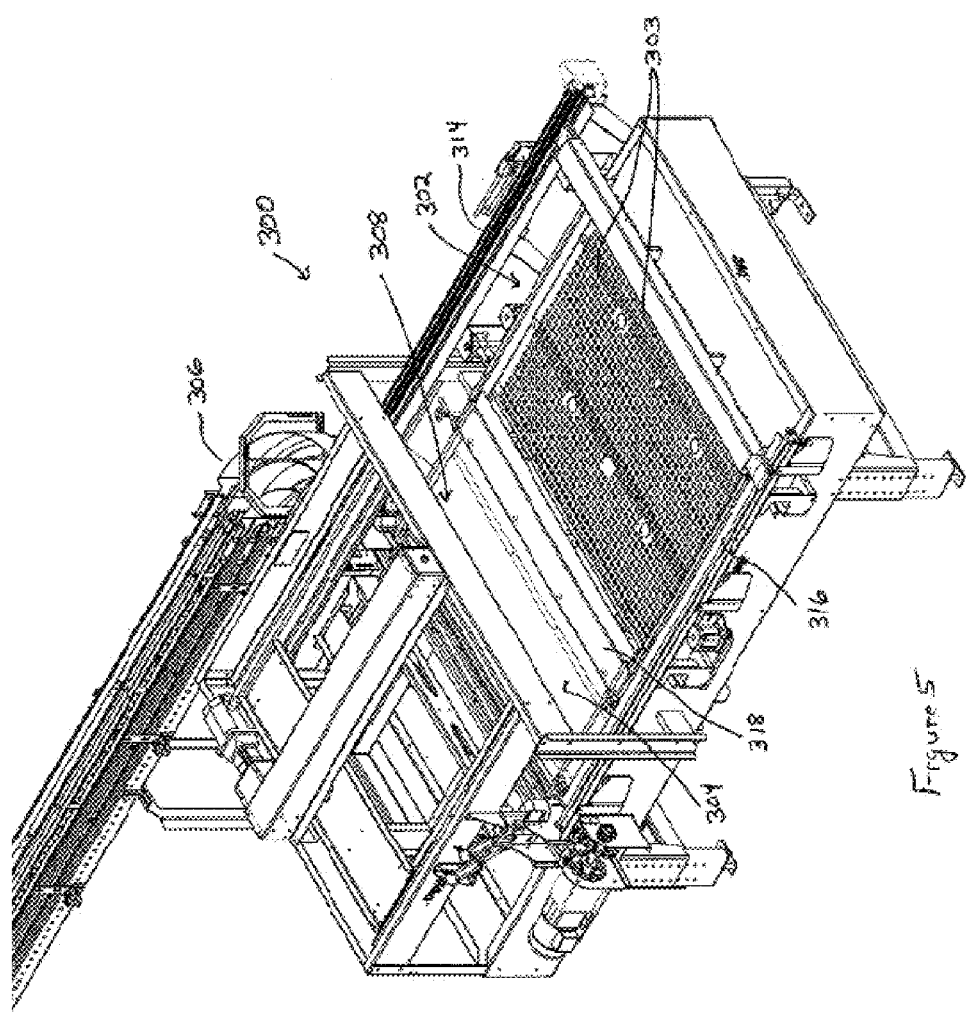
FIG. 5 is a perspective view of a container array forming table.
Figure 10:
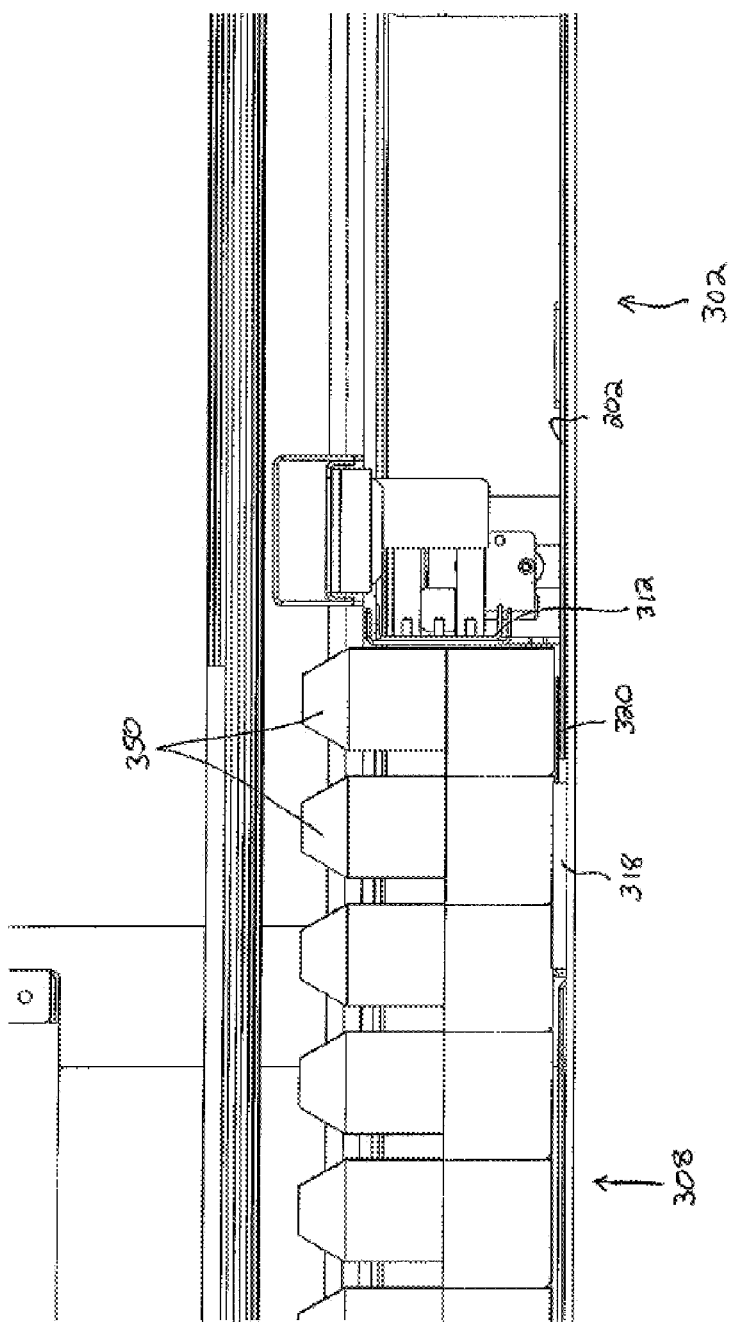
FIG. 10 is an enlarged side view of a portion of the container array forming table similar to FIG. 9 showing the loose-piece articles being advanced to the slipsheet receiving area.
Figure 11:
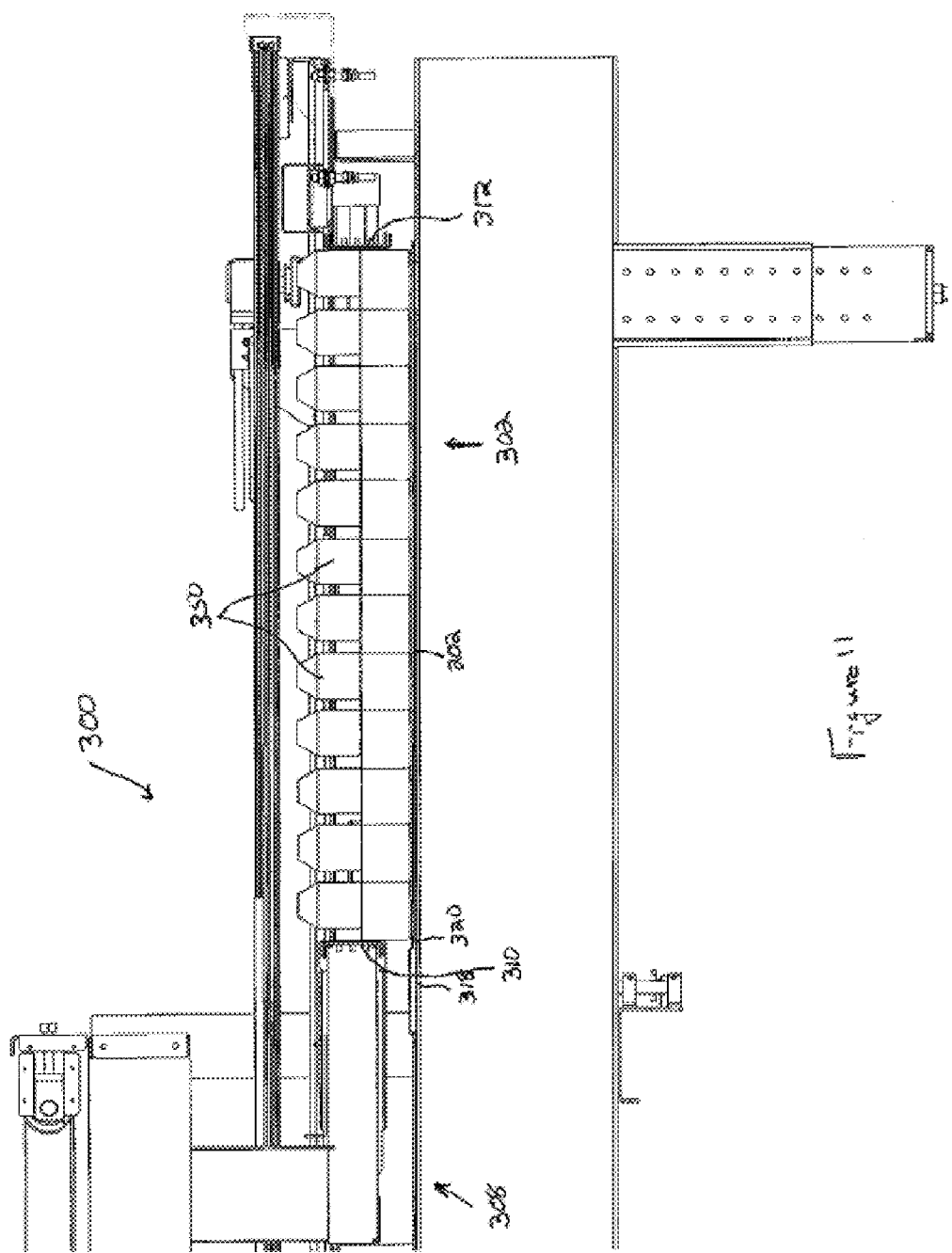
FIG. 11 is a side view of the container array forming table showing the loose-piece articles positioned in the slipsheet receiving area.

The container array forming table 300, as best shown in FIG. 5, has a slipsheet receiving area 302 which is positioned on a horizontal work surface 304. The slipsheet receiving area 302 has a plurality of openings 303 which extend through the horizontal work surface 304. The openings 303 can be of varying sizes and configuration. The openings 303 are provided to allow air to move therethrough to prevent the slipsheet 202 from forming a suction or vacuum seal with the surface of the slipsheet receiving area 302, as will be more fully described. An infeed conveyor 306 delivers containers to an array building area 308. In the embodiment shown, the infeed conveyor 306 is spaced from the slipsheet receiving area 302. However, as infeed conveyors are known in the art, other configurations and locations of the infeed conveyor can be used without departing from the scope of the invention. The container array forming table 300 has a first movable wall 310 and a second movable wall 312 (as best shown in FIGS. 10 and 11). Rails 314, 316 are provided proximate to sides of the horizontal work surface 304. The movable walls 310, 312 engage the rails 314, 316 and are moveable thereon. A slipsheet hold down mechanism 318 is positioned between the slipsheet receiving area 302 and the array building area 308. As will be more fully described, the slipsheet hold down mechanism 318 extends through the horizontal work surface 304 and is movable between an open position (FIGS. 6 through 8) and a closed position (FIGS. 9 through 12). The slipsheet hold down mechanism 318 has a hold down ramp 320 which extends between a retracted position (FIG. 6) and an extended position (FIG. 8). The slipsheet hold down mechanism 318 and the hold down ramp 320 are driven by a pneumatic actuator, motor or other mechanism known in the industry which is electronically connected to the control device to allow the slipsheet hold down mechanism 318 and the hold down ramp 320 to be moved as required.

The lift head 102 of slipsheet lifting/transfer tower 100 is moved downward, placing the slipsheet 202 on the slipsheet receiving area 302. The suction seal is released and the lift head 102 is raised and the slipsheet lifting/transfer tower 100 is returned to proximate the slipsheet bin 200 to repeat the process.

Figure 6:
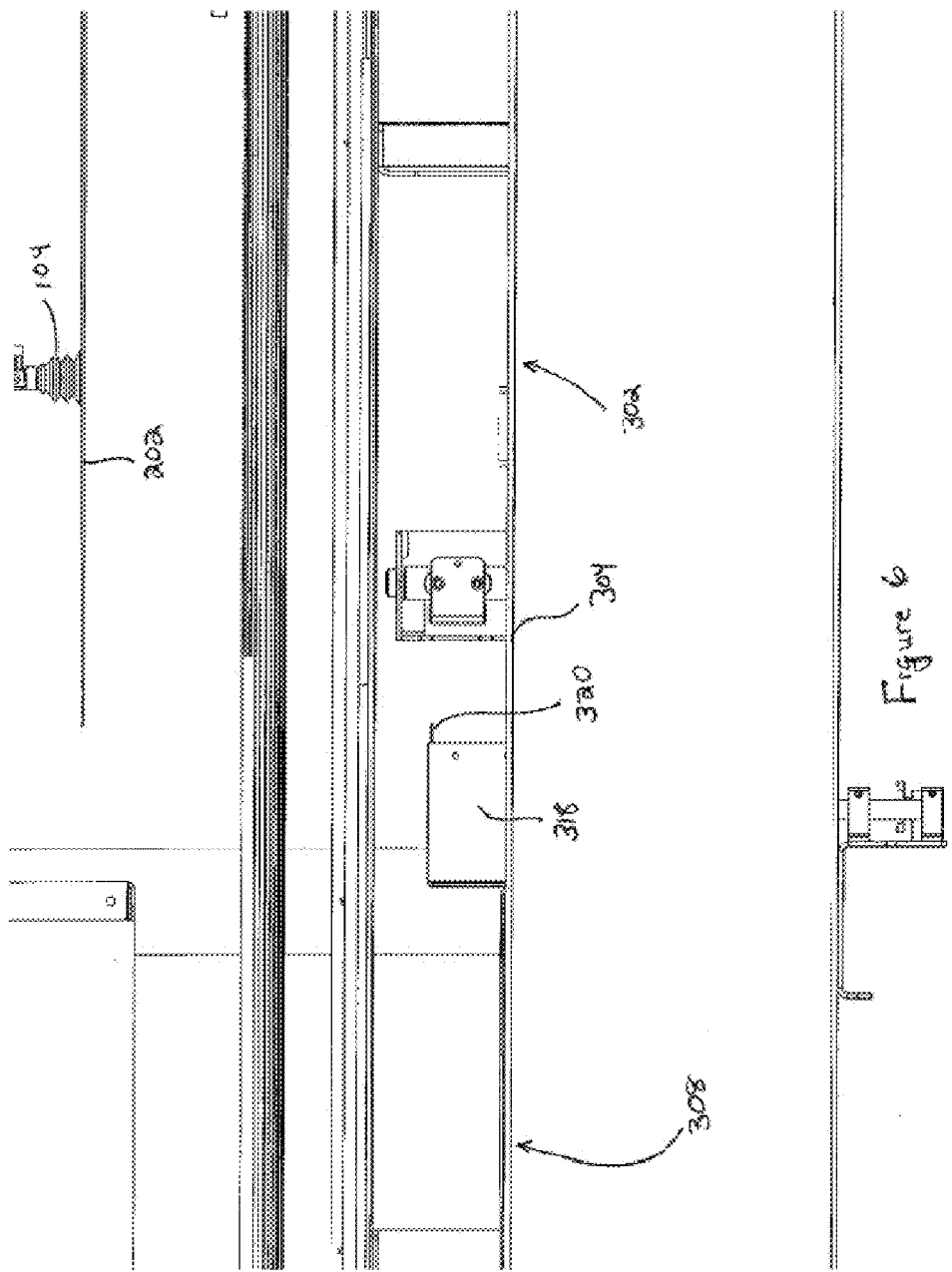
FIG. 6 is an enlarged side view of a portion of the container array forming table showing a slipsheet hold down mechanism in an open position and a hold down ramp in a retracted position.
Figure 7:
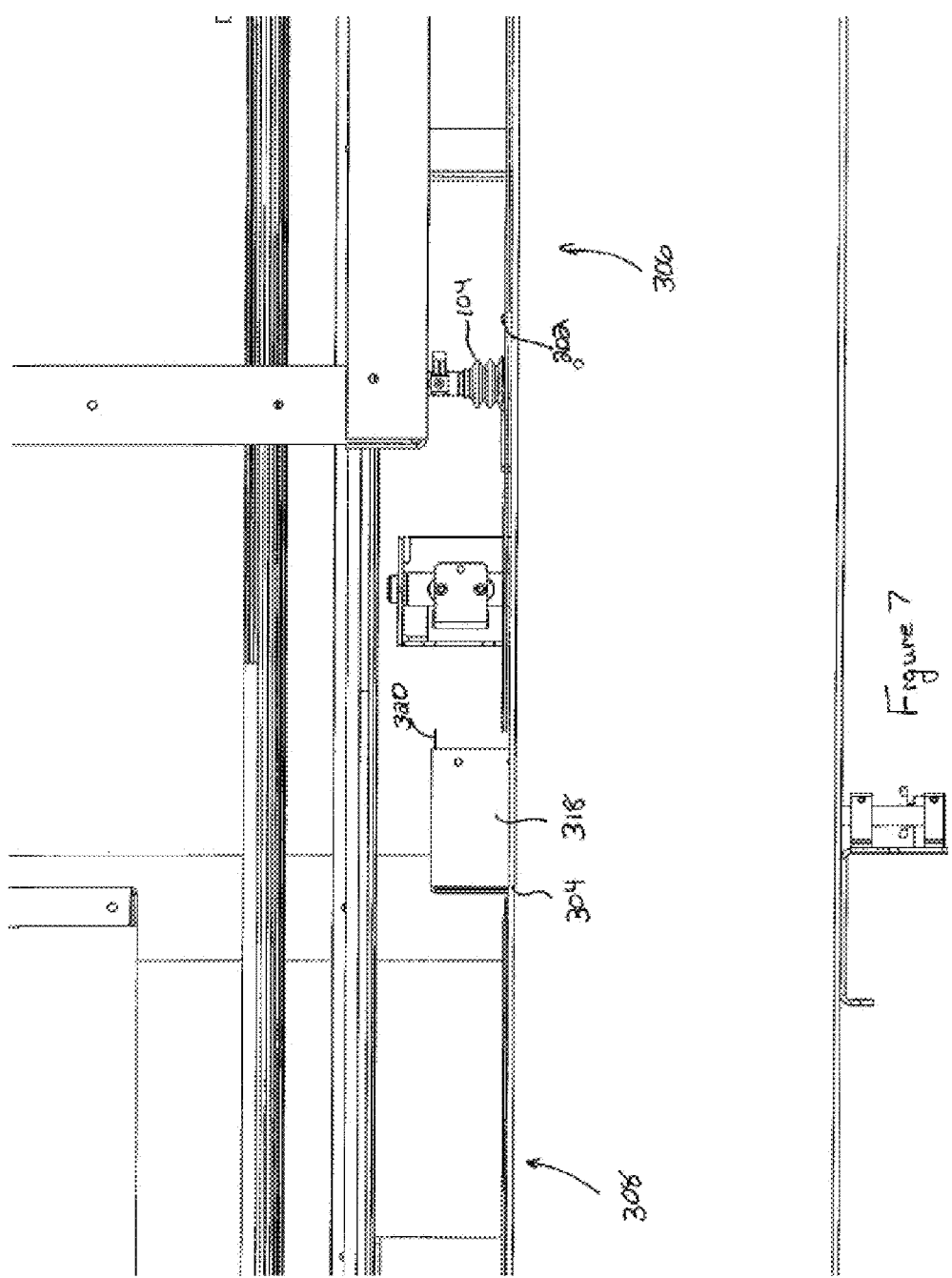
FIG. 7 is an enlarged side view of a portion of the container array forming table similar to that of FIG. 6 with the slipsheet positioned on a slipsheet receiving area.
Figure 8:
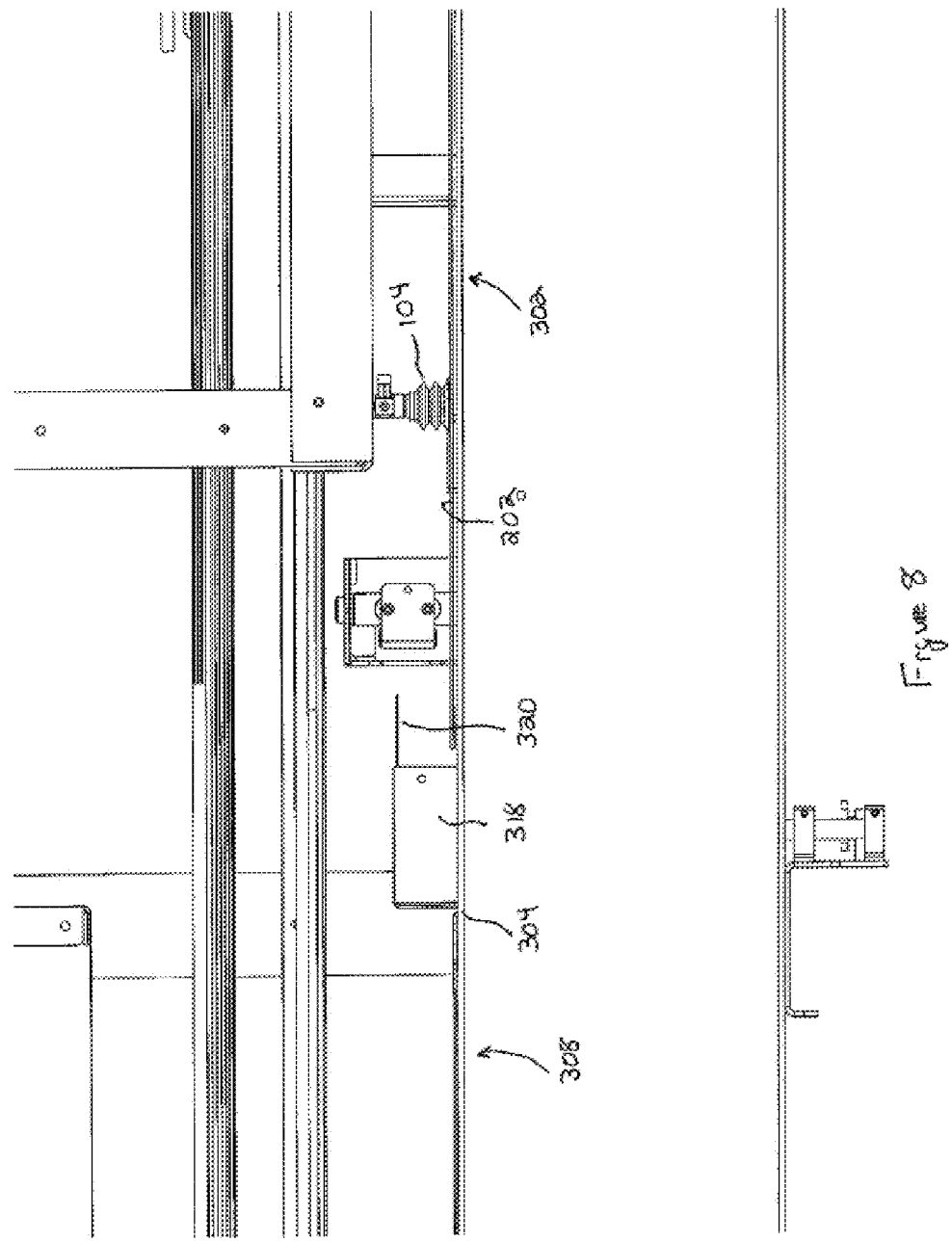
FIG. 8 is an enlarged side view of a portion of the container array forming table similar to FIG. 6 showing the slipsheet hold down mechanism is the open position and the hold down ramp in an extended position.
Figure 9:
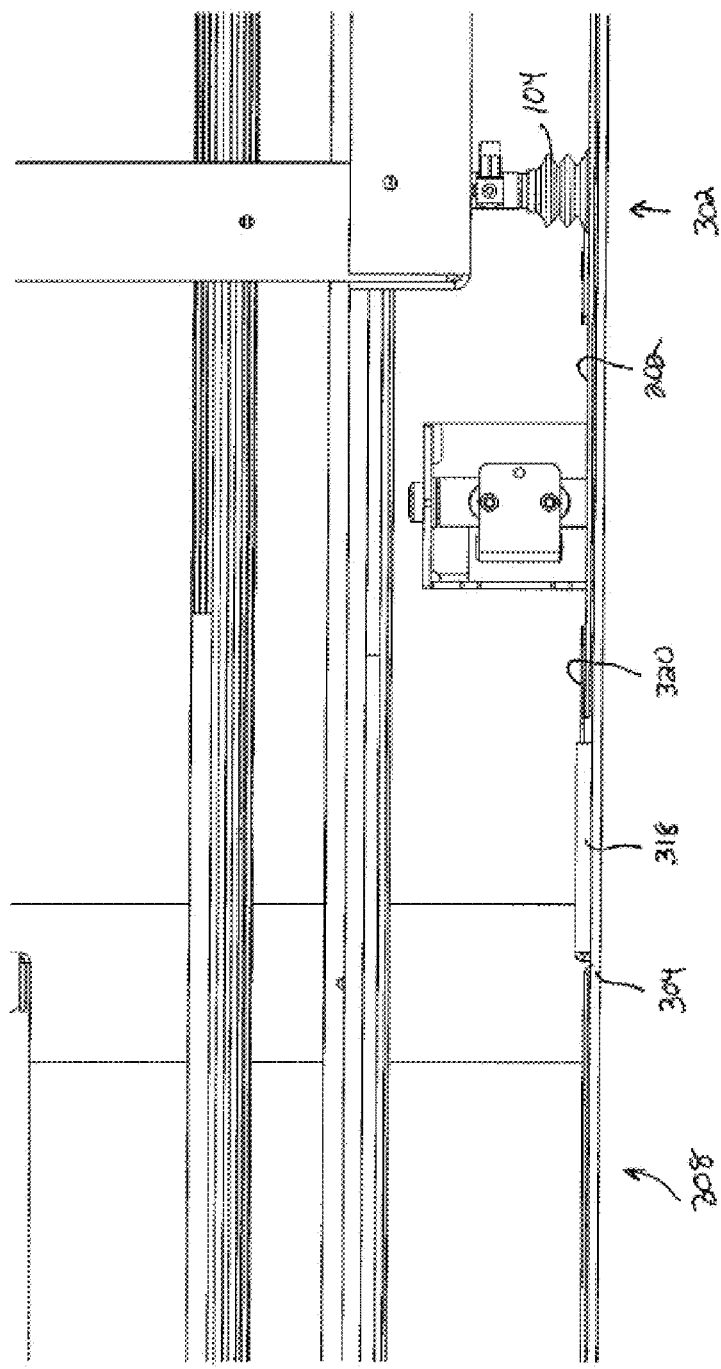
FIG. 9 is an enlarged side view of a portion of the container array forming table similar to FIG. 8 showing the slipsheet hold down mechanism in a closed position and the hold down ramp in the extended position.

Referring to FIGS. 6 through 9, prior to the placement of the slipsheet 202 on the slipsheet receiving area 302, the slipsheet hold down mechanism 318 is moved to the open position and the hold down ramp 320 is retracted (FIG. 6). The slipsheet hold down mechanism 318 and the hold down ramp 320 are maintained in this position as the slipsheet is positioned on the slipsheet receiving area 302 (FIG. 7). With the slipsheet 202 properly positioned, the hold down ramp 320 is extended (FIG. 8) and the slipsheet hold down mechanism 318 is moved to the closed position (FIG. 9), thereby trapping the edge of the slipsheet 202 between the hold down ramp 320 and the horizontal work surface 304.

With the slipsheet 202 properly positioned and the lift head 102 removed, containers 350 are fed between the first and second movable walls 310, 312 by the infeed conveyor 306. The first and second movable walls 310, 312 are spaced apart to allow the containers 350 to be moved therebetween while maintaining the containers 350 in a linear position. With the appropriate number of containers 350 positioned between the first and second movable walls 310, 312, the infeed of containers 350 is stopped. The first and second movable walls 310, 312 are then moved toward the slipsheet receiving area 302. The first wall movable wall 310 is retracted and additional containers 350 are fed between the first row of containers 350 and the first movable wall 310. This process is repeated until the appropriate number of rows of containers 350 is provided on the horizontal work surface 304 to form an array of containers. The entire array of containers 350 is then advanced by the first movable wall. 310 to be positioned over the slipsheet 202, as best shown in FIG. 11. The movable walls and sidewalk 310, 312, 314, 316 are then retracted after the vacuum head 802 has been moved to a first position, as will be more fully described.

Figure 12:
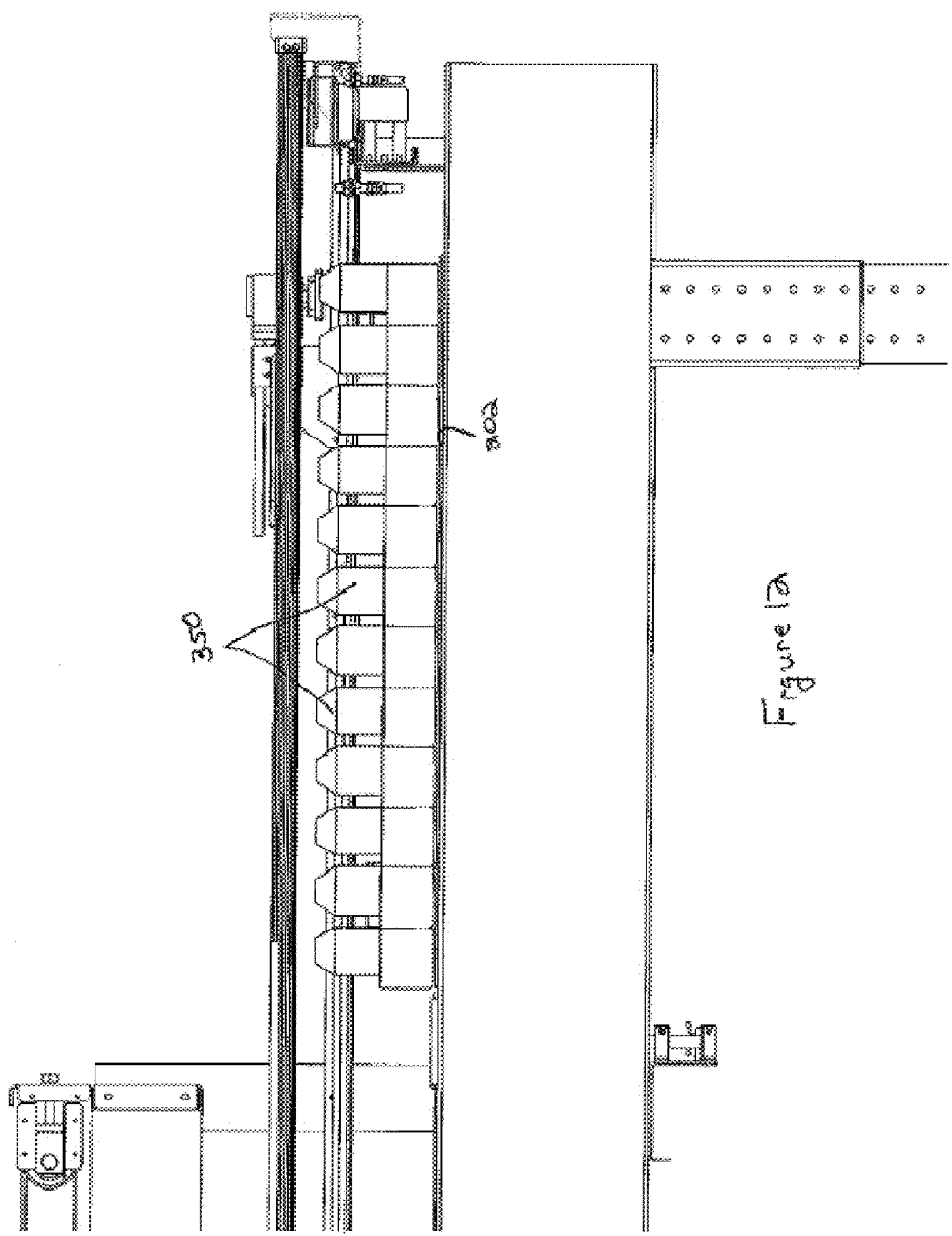
FIG. 12 is a side view of the container array forming table similar to FIG. 11 with the hold down ramp retracted.

Referring to FIGS. 10 through 12, as the containers 350 are advanced from the array building area 308 to the slipsheet receiving area 302, the containers 350 move over the slipsheet hold down mechanism 318 and the hold down ramp 320. Without the use of the hold down ramp 320, the ends of the slipsheet 202 would have a tendency to curl upward, particularly after the slipsheet 202 had been used over many cycles. This upward curl would cause the containers 350 to stub against the curled edge, preventing the containers 350 from being properly inserted onto the slipsheet 202. The use of the slipsheet hold down mechanism 318 and the hold down ramp 320 prevents this stubbing, as the hold down ramp 320 cooperates with the edge of the slipsheet to position and maintain the edge in the same plane as the rest of the slipsheet 202.

Figure 13:
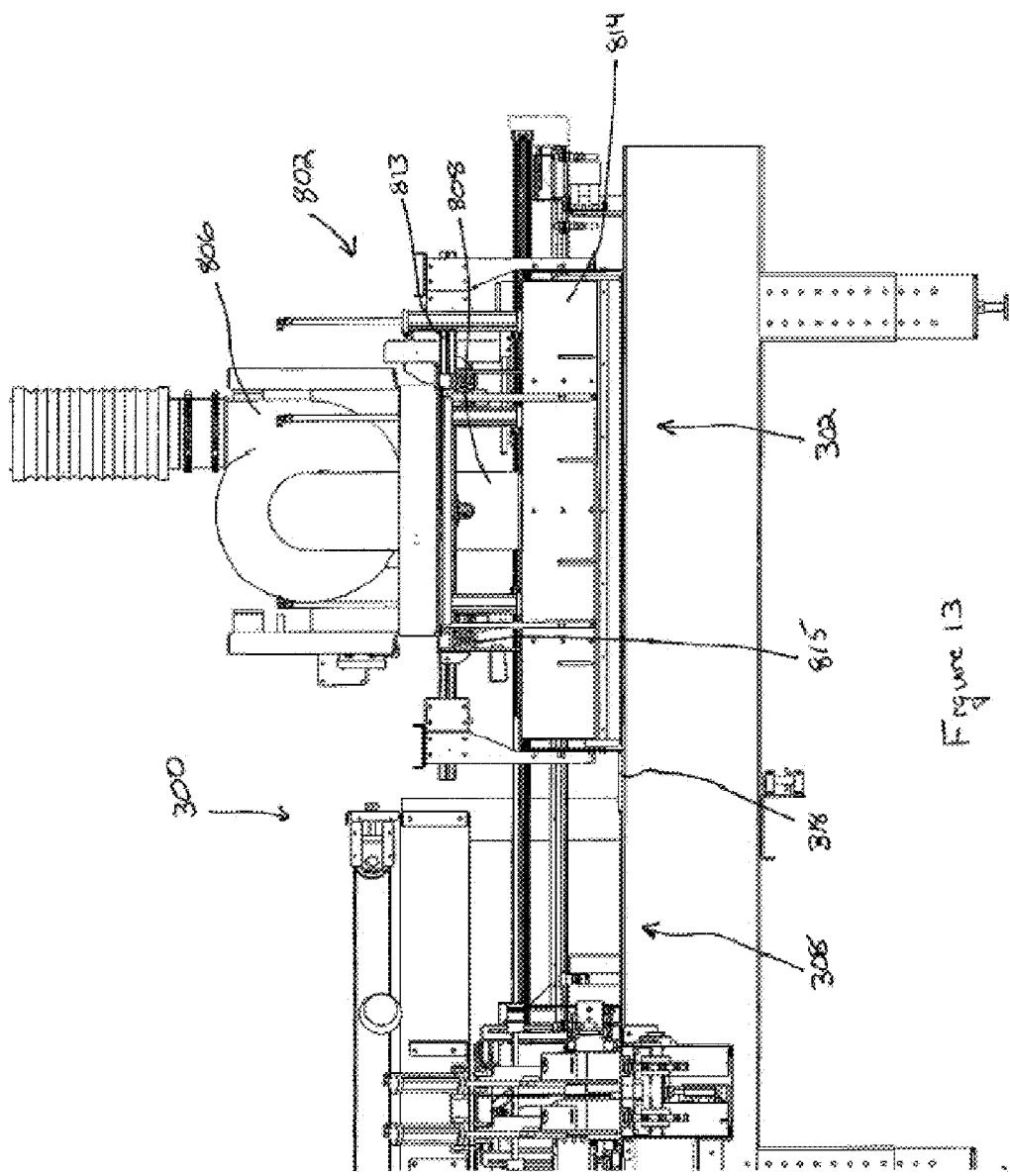
FIG. 13 is a side view of the container array forming table with a vacuum head of an array lifting/transfer tower positioned over the loose-piece articles.

With the containers 350 properly positioned on the slipsheet 202 and the movable walk 310, 312 retracted (FIG. 12), vacuum head 802 of the array lifting/transfer tower 800 is moved into position over the containers 350, as shown in FIG. 13.

Figure 14:
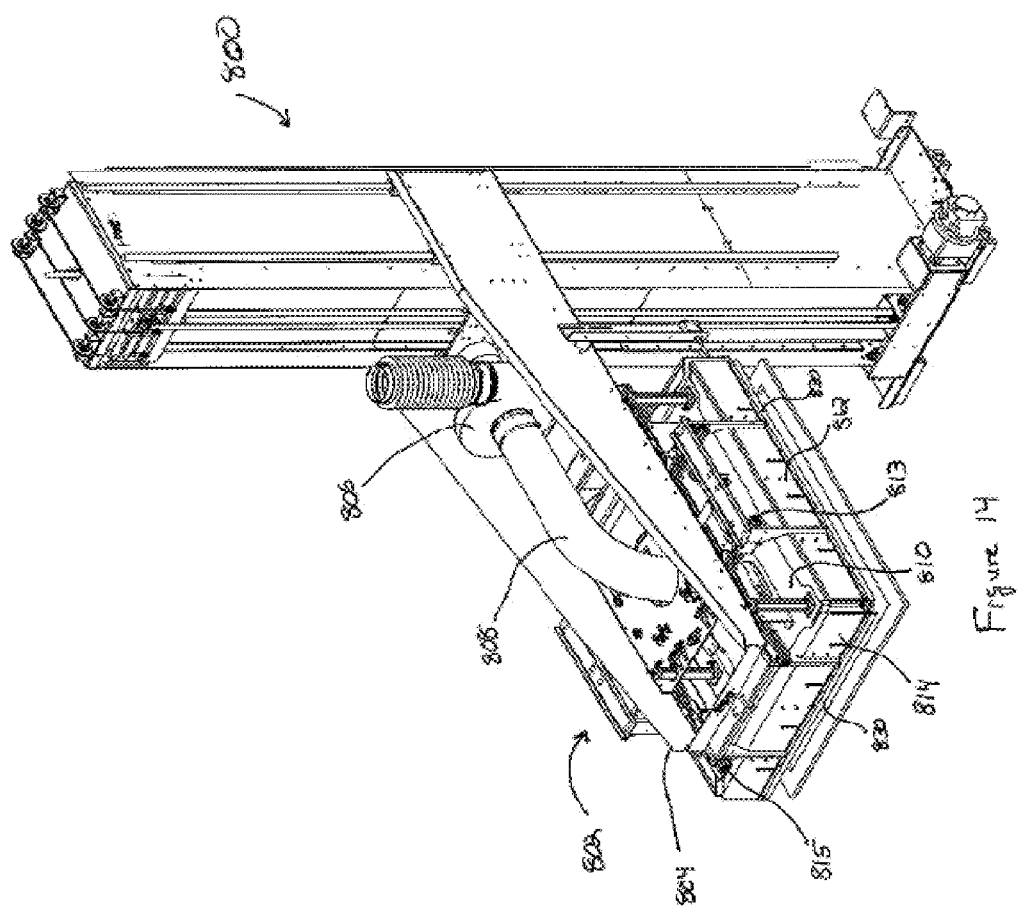
FIG. 14 is a perspective view of the array lifting/transfer tower including the vacuum head.
Figure 15:
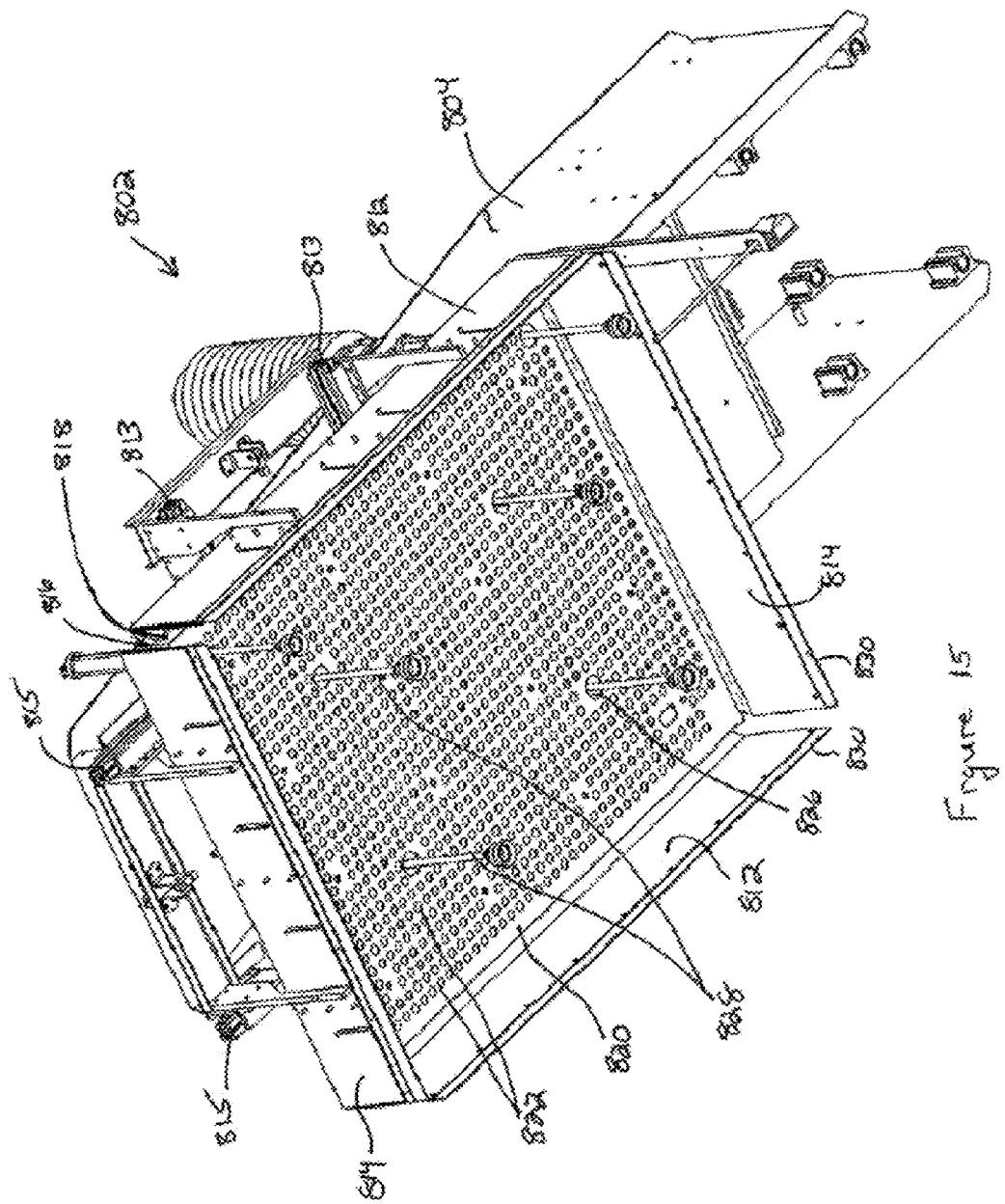
FIG. 15 is a bottom perspective view of the vacuum head showing a bottom surface of a manifold.
Figure 16:
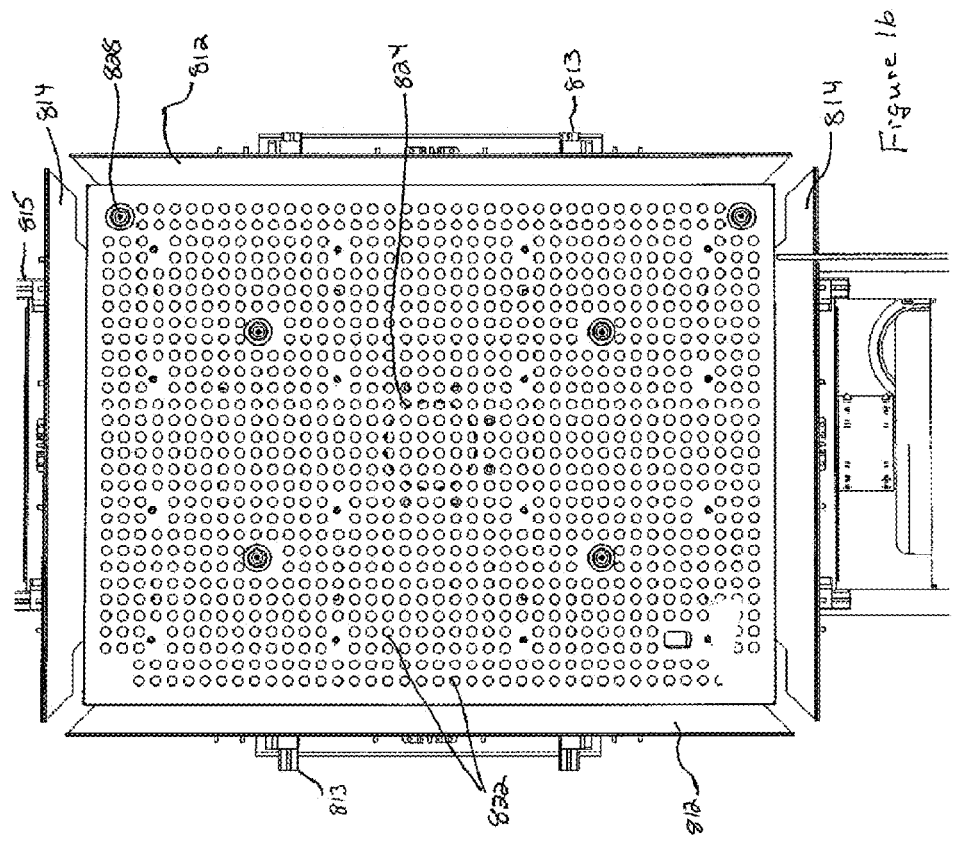
FIG. 16 is a bottom view of the vacuum head.

As best shown in FIGS. 14 through 16, the vacuum head 802 is attached to a frame 804 which is movably connected to the array lifting/transfer tower 800. The frame 804 supports a vacuum blower 806. A flexible tube 808 extends from the vacuum blower 806 to the vacuum head 802. In the embodiment shown, the vacuum head 802 has a generally rectangular configuration with a top surface 810 and movable sidewalls 812, 814. The movable sidewalls 812 are opposed to each other and are movable toward and away from each other. The movable sidewalls 814 are opposed to each other and are movable toward and away from each other. The movable sidewalls 812, 814 are movably mounted in tracks on respective rails 813, 815. A pneumatic actuator, motor or other mechanism known in the industry is connected through any type of standard linkages to move the movable sidewalls 812, 814 between open and closed positions. In the open position, ends of the movable sidewalls 812, 814 are spaced apart from each other, as shown in FIGS. 14 through 16. In the closed position, as shown in FIG. 13, the ends of each movable sidewall 812, 814 abut the ends of other respective movable walls. The pneumatic actuator or motor is electronically connected to the control device to allow the pneumatic actuator or motor to drive the movement of the sidewalls 812, 814 as required. While the embodiment shows a rectangular configuration, other configurations can be used without departing from the scope of the invention.

Figure 17:
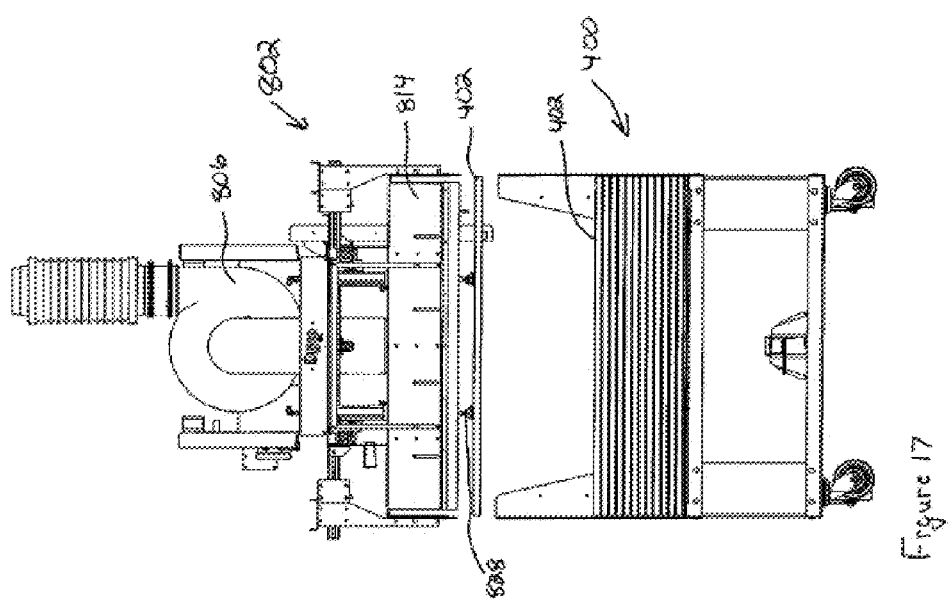
FIG. 17 is a side view of the vacuum head positioned over a top frame bind, the vacuum head having a top frame provided thereon.

Referring to FIGS. 15 and 16, a manifold 816 is positioned proximate the top surface 810 of the vacuum head 802. The manifold's upper surface is the top surface 810 of the vacuum head 802. Sidewalls 818 (FIG. 15) extend from the top surface 810 to a bottom surface 820 of the manifold 816. The bottom surface 820 has openings 822 which extend therethrough. The openings 822 are spaced periodically over the entire surface area of the bottom surface 820, as best shown in FIGS. 16 and 17. Consequently, openings 822 are provided at the center of the bottom surface 820, proximate the periphery of the bottom surface 820, and periodically therebetween. In the embodiment shown, the openings 822 have uniform diameters and are uniformly spaced about the entire surface area of the bottom surface 820. However, the openings 822 can have varied dimensions and configurations, so long as the openings 822 allow for the desired distribution of the vacuum over the entire surface area of the bottom surface 820 and, consequently, over the entire vacuum head 802, as will be more fully discussed. A tube-receiving opening 824 (as best shown through the bottom surface 820 in FIG. 16) extends through the top surface 810. The tube-receiving opening 824 is dimensioned to cooperate with the flexible tube 808, such that when the vacuum blower 806 is engaged, air will be drawn from below the vacuum head 802 through the openings 822 of the bottom surface 820, through the manifold 816, through the tube-receiving opening 824, through the flexible tube 808 and through the vacuum blower 806. The use of the openings 822 allows for significant air to be drawn through the entire area of the bottom surface 820 while utilizing a relatively small blower. In the embodiment shown, a vacuum blower of approximately 2 hp can be used.

Extending periodically through the top surface 810 and the bottom surface 820 are suction receiving cylinders 826. The cylinders 826 extend through the manifold 816 but are sealed to prevent the movement of air through the manifold 816 to effect suction members 828 position in the suction receiving cylinders 826. The suction members 828 are movable, similar to the movable suction members 106 previously described. The suction members 828 have a pneumatic actuator, motor or other mechanism known in the industry, which is electronically connected to the control device, to allow the suction members 828 to be extended and retracted.

With the containers 350 properly positioned on the slipsheet 202 in the slipsheet receiving area 302, the array lifting/transfer tower 800 is moved into alignment with the slipsheet receiving area 302. The movement of the array lifting/transfer tower 800 is controlled by a computer or similar control device and is driven by any appropriate drive mechanism known in the art.

The vacuum head 802 is moved to a first position in which the sidewalk 812, 814 are positioned on all sides and proximate the containers 350. In this first position, the vacuum head 802 is maintained above the horizontal work surface 304. The sidewalk 812, 814 cooperate with the containers 350 to maintain the containers 350 in proper position as the movable walls and sidewalls 310, 312, 314, 316 are retracted. The movable walls and sidewalk 310, 312, 314, 316 and sidewalk 812, 814 maintain the containers 350 in proper alignment within the array of containers and prevent the containers 350 from tipping.

With the movable walls and sidewalls retracted, the vacuum head 802 is moved down to the slipsheet receiving area 302 until resilient free ends 830 of the sidewalls 812, 814 engage the horizontal work surface 304. The free ends or strips 830 are made of plastic, rubber or other similar material which provides some resiliency to allow the free ends 830 to accommodate any slight dimensional variations of the horizontal work surface 304 and the slipsheet 202. With the vacuum head 802 properly positioned, the movable sidewalk 812, 814 are moved inward to engage the outer rows of containers 350 and ensure that the containers 350 are properly positioned with respect to each other. In this closed position, the movable side walls 812, 814, with their resilient free ends 830 in contact with the slipsheet 202, the slipsheet 202 and the manifold 816 create a closed chamber. The vacuum blower 806 is actuated, creating a vacuum, as earlier described, in the region of the vacuum head 802 below the bottom surface 820 in the chamber. This causes the containers 350 and the slipsheet 202 to be sucked toward the bottom surface 820 by the vacuum. As the vacuum is properly dispersed by the openings 822, a vacuum is created below the entire surface area of the bottom surface 820, which causes the entire surface of the slipsheet 202 to be engaged by the vacuum. The engagement of the slipsheet 202 allows the slipsheet 202 and the containers 350 thereon to be uniformly lifted. The use of the solid, uniform surface of the slipsheet 202 allows for the uniform movement of the containers while utilizing the small vacuum blower 806. As the vacuum works on a single piece slipsheet 202, which has an entire surface exposed to the vacuum, rather than individual containers 350, which have minimal surface area exposed to the vacuum, the reliability and efficiency of the vacuum head is greatly increased. This also permits the vacuum head 802 to be used with a wide variety of containers.

The plurality of openings 303 on the horizontal work surface 304 in the slipsheet receiving area 302 also facilitates the removal of the slipsheet 202 by the vacuum head 802. The openings 303 prevent the slipsheet 202 from forming a suction grip with the horizontal work surface 304. Consequently, as the slipsheet 202 is easily removed from the horizontal work surface 304, the size of the vacuum blower 806 can be minimized, as a significant initial vacuum is not needed to lift the slipsheet 202.

With the slipsheet 202 and containers 350 maintained in position relative to the vacuum head 802, the vacuum head is lifted and moved to the pallet-building area 500 in which an empty pallet 502 has been delivered from the pallet infeed assembly 600. The vacuum head 802 is aligned with the pallet-building area 500 and the pallet 502. The vacuum head 802 is lowered to the pallet 502. The vacuum blower 806 is turned off and the vacuum applied to the slipsheet 202 is terminated. The movable sidewalk 814, 816 are moved away from the containers 350. The vacuum head 802 is removed and the slipsheet 202 and the containers 350 remain in the pallet-building area 500.

This entire process is repeated until the number of levels of slipsheet 202 and containers 350 reaches the desired height. When the desired height is reached, the vacuum head 802 is moved over the top frame bin 400.

Referring to FIG. 17, top frames 402 are positioned in the top frame bin 400. The top frame bin 400 is provided on wheels to be movable to allow the top frame bin 400 to be moved from its position relative to the array lifting/transfer tower 800 when the top frame bin 400 is empty. A new top frame bin 400 with additional top frames 402 can then be moved into position.

Figure 18:
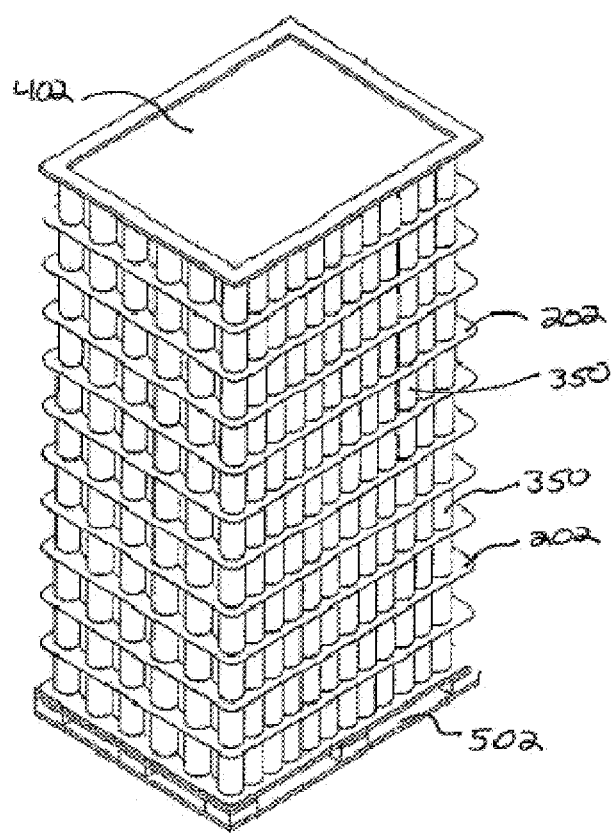
FIG. 18 is a perspective view of a pallet with layers of the loose-piece articles positioned on the slipsheets.

The vacuum head is lowered and the suction members 828 are lowered and engage a top frame 402. This causes a suction seal to be created between the top frame 402 and the suction members 828. With the suction seal created, the vacuum head 802 is raised and the array lifting/transfer tower 800 is moved such that the top frame 402 is positioned above the pallet-building area 500. The vacuum head 802 is moved downward, placing the top frame 402 on the constructed pallet. The suction seal is released and the vacuum head 802 is raised. The completed pallet, as shown in FIG. 18, is advanced to the pallet discharge conveyor 700.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A movable vacuum head for moving loose-piece articles positioned on a slipsheet, the movable vacuum head comprising:
  a frame;
  a blower provided proximate the frame, the blower having an air intake member;
  a manifold having a top surface and a bottom surface, the top surface having an opening which receives the air intake member therein, the bottom surface having a plurality of openings which extend through the bottom surface and which are spaced over the entire surface area of the bottom surface; and
  movable walls extending from the frame and laterally surrounding the manifold, the walls positioned proximate the bottom surface of the manifold;
  wherein in response to loose-piece articles being arranged proximate to and beneath the bottom surface of the manifold and laterally surrounded by the movable walls and the blower activated, at least a portion of the plurality of openings are sized and arranged to uniformly draw air through throughways formed between adjacent loose-piece articles and through throughways formed between a perimeter of the arranged loose-piece articles and the movable walls;
  wherein when the vacuum head is moved into proximity with the loose-piece articles and the planar slipsheet and the movable walls engage the slipsheet, and the blower is activated, a vacuum chamber is created between the bottom surface of the manifold, the movable walls and the slipsheet which causes the slipsheet, and the loose-piece articles positioned thereon, to be drawn toward the bottom surface and maintained in such position as the movable vacuum head transports the slipsheet and the loose-piece articles positioned thereon.

2. The movable vacuum head as recited in claim 1 wherein the movable walls have first ends and opposed second ends, the first ends are provided proximate the bottom surface of the manifold and the second ends have resilient strips mounted thereon.

3. The movable vacuum head as recited in claim 2 wherein the movable walls are movably mounted on rails, whereby the movable walls can be moved between an open position in which ends of the movable walls are spaced apart from each other and a closed position in which the ends of each movable walls abuts ends of other respective movable walls.

4. The movable vacuum head as recited in claim 3 wherein the resilient strips engage the slipsheet to create a vacuum chamber when the movable walls are in the closed position between the bottom surface of the manifold, the movable walls and the slipsheet.

5. The movable vacuum head as recited in claim 1 wherein the plurality of openings extending through the bottom surface are of uniform diameter and are uniformly spaced about the entire surface area of the bottom surface.

6. The movable vacuum head as recited in claim 1 wherein suction receiving cylinders extend through the manifold.

7. The movable vacuum head as recited in claim 6 wherein suction members are positioned in the suction receiving cylinders and are movable relative to the movable vacuum head.

8. A method of transporting loose-piece articles using a vacuum head, the method comprising:
placing the loose-piece articles on a planar slipsheet in a first collection area;
moving the vacuum head proximate the loose-piece articles and the slipsheet, the vacuum head comprising:
a manifold having a top surface and a bottom surface, the top surface having an opening which receives the air intake member therein, the bottom surface having a plurality of openings which extend through the bottom surface and which are spaced over the entire surface area of the bottom surface; and
movable walls extending from the frame and laterally surrounding the manifold, the walls positioned proximate the bottom surface of the manifold; and
moving the movable walls to a position proximate the loose-piece articles and engaging the slipsheet prior to drawing a vacuum thereby creating a vacuum chamber between the bottom surface of the manifold, the movable walls and the slipsheet;
drawing air through the plurality of openings of the bottom a surface of the manifold of the vacuum head thereby creating a vacuum below the bottom surface, wherein in response to loose-piece articles being arranged proximate to and beneath the bottom surface of the manifold and laterally surrounded by the movable walls and the blower activated, at least a portion of the plurality of openings are sized and arranged to uniformly draw air through throughways formed between adjacent loose-piece articles and through throughways formed between a perimeter of the arranged loose-piece articles and the movable walls;
using the vacuum to draw the slipsheet toward the surface, thereby drawing the loose-piece articles on the slipsheet toward the surface; and
transporting the slipsheet and loose-piece articles to a second collection area.

9. The method as recited in claim 8 wherein the surface of the vacuum head having a plurality of openings which extend through the surface and which are spaced over the entire surface area of the surface.

10. The method as recited in claim 8 wherein the slipsheet is positioned on a slipsheet receiving area of an array forming table prior to the loose-piece articles being placed thereon, the slipsheet receiving area having a plurality of openings which extend through the slipsheet receiving area.

11. The method as recited in claim 10 wherein a hold down ramp of a slipsheet hold down mechanism engages an edge of the slipsheet positioned in the slipsheet receiving area prior to the loose-piece articles being placed on the slipsheet to maintain the edge of the slipsheet in the same plane as the body of the slipsheet.

12. The method as recited in claim 11 wherein the slipsheet hold down mechanism is moved from an open position prior to the slipsheet being positioned on the slipsheet receiving area to a closed position after the slipsheet has been placed on the slipsheet receiving area.

13. The method as recited in claim 12 wherein the hold down ramp is moved from a retracted position prior to the slipsheet being positioned on the slipsheet receiving area to an extended position after the slipsheet has been placed on the slipsheet receiving area.

14. The method as recited in claim 13 wherein the loose-piece articles are moved from an array building area of the array forming table, over the slipsheet hold down mechanism in the closed position, to the slipsheet.

15. The method as recited in claim 14 wherein the vacuum head is moved to a first position in which the vacuum head is maintained above the array forming table and movable sidewalls of the vacuum head are positioned proximate the loose-piece articles, whereby the moveable sidewalls cooperate with the loose-piece articles to maintain the loose-piece articles in position as movable walls of the array forming table are retracted from the loose-piece articles.

16. The method as recited in claim 15 wherein the movable sidewalls of the vacuum head are moved inward when the vacuum head is positioned proximate the loose-piece articles.

17. A loose-piece array forming table for forming an array of loose-piece articles on a slipsheet, the loose-piece array forming table comprising:
an array building area;
a slipsheet receiving area proximate the array building area, the array building area and the slipsheet receiving area having a horizontal planar work surface which extends therebetween;
a slipsheet hold down mechanism provided between the array building area and the slipsheet receiving area, the slipsheet hold down mechanism being moveable between an open position which allows the slipsheet to be positioned on the slipsheet receiving area and a closed position in which an edge of the slipsheet is engaged by the slipsheet hold down mechanism, the slipsheet hold down mechanism having a hold down ramp which is movable between an extended position and a retracted position, the slipsheet hold down mechanism extending through the horizontal planar work surface when moving between the extended position and the retracted position, the hold down ramp positioned above the horizontal planar work surface when the slipsheet hold down mechanism is in the extended position and the retracted position;

a movable wall which cooperates with the loose-piece articles to advance the loose-piece articles from the array building area to the slipsheet receiving area.

18. The loose-piece array forming table as recited in claim 17 wherein the slipsheet hold down mechanism has a hold down ramp which is movable between an extended position and a retracted position.

19. The loose-piece array forming table as recited in claim 18 wherein the slipsheet hold down mechanism must be in the closed position and the hold down ramp must be in the extended position prior to the loose-piece articles being advanced from the array building area to the slipsheet receiving area.

20. The loose-piece array forming table as recited in claim 17 wherein the slipsheet receiving area has a plurality of openings which extend through the work surface.

21. The loose-piece array forming table as recited in claim 17 wherein movable sidewalls provided proximate the slipsheet receiving area, the movable sidewalls cooperate with the loose-piece articles to properly align the loose-piece articles when the loose-piece articles are positioned on the slipsheet.

* * * * *